(12) United States Patent
Whitnall et al.

(10) Patent No.: US 7,767,620 B2
(45) Date of Patent: Aug. 3, 2010

(54) HYBRID POROUS ORGANIC-METAL OXIDE MATERIALS

(75) Inventors: Wesley Whitnall, Toronto (CA);
Tewodros Asefa, Montreal (CA);
Geoffrey Alan Ozin, Toronto (CA)

(73) Assignee: Novx Systems Inc., Markham, ON (CA)

( * ) Notice: Subject to any disclaimer, the term of this patent is extended or adjusted under 35 U.S.C. 154(b) by 330 days.

(21) Appl. No.: 10/593,054

(22) PCT Filed: Mar. 16, 2005

(86) PCT No.: PCT/CA2005/000406

§ 371 (c)(1),
(2), (4) Date: Jun. 25, 2007

(87) PCT Pub. No.: WO2005/087369

PCT Pub. Date: Sep. 22, 2005

(65) Prior Publication Data

US 2008/0193734 A1    Aug. 14, 2008

Related U.S. Application Data

(60) Provisional application No. 60/553,121, filed on Mar. 16, 2004.

(51) Int. Cl.
*B01J 20/10* (2006.01)
*B01J 20/22* (2006.01)
*A01K 1/015* (2006.01)
*C01B 33/12* (2006.01)

(52) U.S. Cl. .............. 502/407; 502/401; 428/221; 423/335

(58) Field of Classification Search .......... 502/401, 502/407; 428/221; 423/335
See application file for complete search history.

(56) References Cited

U.S. PATENT DOCUMENTS 6,248,686 B1    6/2001 Inagaki et al.
(Continued)

FOREIGN PATENT DOCUMENTS

CA    2440990    10/2002

OTHER PUBLICATIONS

Fowler, C.E., Lebeau, B. & Mann, S. "Covalent coupling of an organic chromophore into functionalized MCM-41 mesophases by template-directed co-condensation." Chem. Commun. 1825-26 (1998).*
"Periodic mesoporous organosilicas with organic groups inside the channel walls" Nature, vol. 402, Issue 6764, pp. 867-871 (1999) Asefa et al.
"Novel Bifunctional Periodic Mesoporous Organosilicas, BPMOs" J Am Chem Soc. 2001 Sept 5; 123(35):8520-30, Asefa et al.
(Continued)

*Primary Examiner*—Timothy C Vanoy
*Assistant Examiner*—Daniel Berns
(74) *Attorney, Agent, or Firm*—Lynn C. Schumacher; Hill & Schumacher

(57) ABSTRACT

The present invention provides a synthetic strategy for creating a new class of materials called hybrid mesoporous, macroporous, or mesoporous-macroporous organometaloxide materials, exemplified but not limited to hybrid mesoporous organosilicas. This strategy involves taking a pre-assembled mesoporous material having a porous framework and then attaching an organic, inorganic or biological guest molecule to the pore walls of the framework material through two or more chemical linkages. The unusual combination of inorganic and organic components organized into a material with mesoscale porosity and having bridge bonded organic, organometallic, or biological functionalized surfaces suggests a myriad of uses for these composite materials, such as the controlled release and uptake of chemicals and drugs, chiral separations and catalysis, electronic printing and microelectronic packaging, thermal and acoustical insulation.

61 Claims, 10 Drawing Sheets

U.S. PATENT DOCUMENTS 6,641,657 B2 * 11/2003 Pinnavaia et al. ........... 106/601
6,696,538 B2     2/2004  Ko
6,960,551 B2 * 11/2005 Ozin et al. ................. 502/168
2007/0173401 A1 *  7/2007 Landskron et al. .......... 502/232

OTHER PUBLICATIONS

"Highly Stable Mesoporous Metal Oxides Using Nano-Propping Hybrid Gemini Surfactants", J Am Chem Soc. 2004, 126, 2310-2311, Lyu et al.

* cited by examiner

SCHEME 1

HYBRID POROUS ORGANIC-METAL OXIDE MATERIALS

CROSS REFERENCE TO RELATED U.S. PATENT APPLICATIONS

This patent application is a National Phase application claiming the benefit of PCT/CA2005/000406 filed on Mar. 16, 2005; which further claims the priority benefit from U.S. provisional patent application Ser. No. 60/553,121 filed on Mar. 16, 2004 in English entitled HYBRID ORGANIC-INORGANIC MESOPOROUS MATERIALS, which is incorporated herein in its entirety by reference.

FIELD OF THE INVENTION

The present invention relates to new composite materials, which include a mesoporous, macroporous, or mesoporous-macroporous framework material having guest molecules bound through two or more chemical linkages to pore walls of the framework. The framework material may be a simple metal oxide or an organometaloxide material. The properties of these composite materials can be easily tuned through organic chemistry to fit a desired application by introducing functional guest molecules carrying organic, organometallic or biological groups exclusively on the surfaces of the pores of a preexisting mesoporous, macroporous, or mesoporous-macroporous framework material. The high porosity and surface area, as well as the controllable properties due to the presence of functional organic, organometallic or biological groups exclusively on the surfaces of these materials make them ideal candidates for use in applications such as microelectronics, catalysis, sensors, chromatography, drug and chemical release delivery, and bioassays.

BACKGROUND OF THE INVENTION

Porous materials namely mesoporous and macroporous materials are interesting classes of materials useful for various practical applications. Kresge, C. T.; Leonowicz, M.; Roth, W. J.; Vartuli, J. C.; Beck, J. C., Ordered mesoporous molecular sieves synthesized by a liquid-crystal template mechanism, Nature, 359, 710 (1992); Blanco, A.; Chomski, E.; Grabtchak, S.; Ibisate, M.; John, S.; Leonardo, S. W.; Lopez, C.; Meseguer, F.; Miguez, H.; Mondia, J. P.; Ozin, G. A.; Toader, O.; Van Driel, H. M., Large-scale synthesis of a silicon photonic crystal with a complete 3-dimensional bandgap near 1.5 micrometers, Nature, 405, 437 (2000). The discovery of periodic mesoporous silica materials denoted M41S or MCM-type having pore sizes 2-10 nm in 1992 represented a paradigm shift in the synthesis of porous inorganic materials with a structure founded upon a regular array of monodispersed pores in the mesoscale size range of 2-50 nm defined by the International Union of Pure and Applied Chemistry IUPAC convention for porous solids.

To amplify, the materials were prepared in a straightforward synthesis that involved the aqueous phase co-assembly and acid or base catalyzed hydrolytic poly-condensation of silicate-surfactant micelles followed by removal of the surfactant by thermal or chemical or photochemical post-treatment steps. This synthesis strategy created a silica replica of the templating micelles (a silicatropic mesophase) and represented a new way of creating silica materials with crystalline mesoporosity having a pore architecture (e.g., hexagonal, cubic, worm-hole) and pore dimensions (range of diameters 2-10 nm) that were predicated upon the structure and dimensions of the surfactant-directing micelle assembly. Using this synthetic approach the mesopore dimensions could be chemically controlled with angstrom precision anywhere in the range of 2-10 nm. In a creative extension of this strategy, researchers at the University of California at Santa Barbara demonstrated that by using tri-block copolymer micelles, involving for example the co-assembly of a polypropylene oxide-b-polyethylene oxide-b-polypropylene oxide mesophase with silicate precursors, as a new and larger dimension templating mesophase, then the mesopore size range of the MCM41 class of periodic mesoporous silica materials could be boosted to the upper mesoscale range of 10-30 nm to create a new class of much larger mesopore silica materials that were denoted SBA periodic mesoporous silicas, see—Zhao, D.; Feng, J.; Huo, Q.; Melosh, N.; Fredrickson, G. H.; Chmelka, B. F.; Stucky G. D., Triblock Copolymer Syntheses of Mesoporous Silica with Periodic 50 to 300 Angstrom Pores, Science 279, 548 (1998).

It is important to note that the channel walls of all of these MCM and SBA classes and structure types of periodic mesoporous silicas were glassy having just short range order, the channel walls lacked structurally well-defined silica sites like those found in zeolites (a class of solids defined as crystalline microporous aluminosilicates), and were found to be devoid of useful channel functionality for perceived applications that could benefit from the size and shape controlled mesopores and specific adsorption properties of the materials. In other words while the mesopores in MCM41, MCM48 and SBA materials were monodispersed (single size) and the mesoporosity could be either periodic (hexagonal, cubic) or randomly organized (worm hole—see Linssen, T.; Cassiers, K.; Cool, P.; Vansant, E. F., Mesoporous templated silicates: an overview of their synthesis, catalytic activation and evaluation of the stability, Adv. Coll. Interf. Sci., 103, 121 (2003)), the material behaved more or less like any other form of porous silica derived from say silica sol-gel type chemistry, exemplified by well-known classes of materials called xerogels and aerogels, and that contained a random spatial distribution of different diameter mesopores in a glassy silica matrix. Hence the envisioned benefits of this new class of periodic mesoporous silica MCM41, MCM48 and SBA materials were never really realized in practice and to the best of our knowledge no products or processes have emerged in the more than ten years since their discovery.

Since their discovery, tremendous efforts have been devoted to overcome the functionality deficiency of the MCM41, MCM48 and SBA class of mesoporous silica materials by, for example, incorporating other elements into the materials, creating entirely different compositions, crystallizing the constituents of the channel walls, and of particular relevance to the present invention, by incorporating useful organic functionality into the materials, see—Asefa, T.; Ozin, G. A.; Grondey, H.; Kruk, M.; Jaroniec, M., Recent developments in the synthesis and chemistry of periodic mesoporous organosilicas, Studies Surf. Sci. Catal. 141, 1 (2002). In the context of the latter direction of investigation, two main methods of building organic function into periodic mesoporous silica to create organic-functionalized mesoporous materials have been devised. The first involving a three-step process based upon first synthesizing by template directed means a periodic mesoporous silica, second removing said template from the as-synthesized periodic mesoporous silica and third grafting organo-functionalized alkoxysilanes $RSi(OEt)_3$ to channel surface silanol groups SiOH to give the desired organic-functionalized mesoporous materials. In the second approach, instead of a three-step process a one-step method is utilized to obtain the desired periodic mesoporous organosilica that involves co-assembly of organo-functionalized alkoxysilanes $RSi(OEt)_3$ with alkoxysilanes $Si(OEt)_4$, see—Stein, A.; Melde B. J.; Schroden, R. C. Hybrid inorganic-organic mesoporous silicates—Nanoscopic reactors coming of age *Adv. Mater.* 12, 1403 (2000). The organic groups utilized in the precursors $RSi(OEt)_3$ used for both of these synthetic approaches, which ends up in the desired periodic mesoporous organosilica product is "terminally" bound to the silicon atom in said precursors and said product. Whichever synthetic strategy is used to make these organo-functionalized mesoporous materials with organic groups terminally bound to the walls of the channels, the surfactant template can be removed from the material by thermal or chemical or photochemical post-treatment steps. In this context of template removal from said as-synthesized organic-functionalized mesoporous materials, thermal usually means heating in air or oxygen to oxidatively remove said template from said as-synthesized organic-functionalized mesoporous materials under conditions that do not destroy said terminal organic function; photochemical usually means irradiating said template containing organic-functionalized mesoporous materials with ultraviolet light in air or oxygen to photooxidatively remove said template from said as-synthesized periodic mesoporous silica under irradiation conditions that do not destroy said terminal organic function; chemical usually means reacting said template containing organic-functionalized mesoporous materials with a reagent that serves to chemically remove said template from said as-synthesized periodic mesoporous silica under conditions that do not destroy said terminal organic function.

Another way of incorporating this kind of terminally bound organic functionality to the pore walls of the periodic mesoporous silica is a modification of the three-step grafting procedure described above but is instead reduced to a two-step process by circumventing the template removal step. This is achieved by adding the organo-functionalized alkoxysilane $RSi(OEt)_3$ directly to the as-synthesized template-containing periodic mesoporous organosilica whereby it is able to simultaneously displace the imbibed template from the periodic mesoporous silica and at the same time anchor to silanol groups on the pore wall of the periodic mesoporous silica as a terminally bound organic group through a single chemical linkages, see—Valentyn, A.; Mietek, J., Simultaneous modification of mesopores and extraction of template molecules from MCM-41 with trialkylchlorosilanes, *Chem. Commun*, 23, 2373 (1999) and Liu, Y.-H.; Lin, H.-P.; Mou, C.-Y., Direct method for surface silyl functionalization of mesoporous silica, *Langmuir,* 20, 3231 (2004).

To emphasize, in all three cases mentioned above the desired organic function in the resulting periodic mesoporous organosilica material is chemically bound to the surface of the channel walls as a "terminal organic group through a single chemical linkage" and protrudes into the channel and hence to some extent occupies channel void space and also serves to block the passage of guests in the channels. Moreover the distribution of organic functional groups within the channels is not strictly under control and effects of localized anchoring in the pore mouths of the mesopores and phase separation of precursors, results in inhomogeneous patterns of organic groups on the surface of the channel walls.

A creative and inventive way to circumvent all of these problems with surface attached terminal organic groups on the channel walls of periodic mesoporous organosilicas was reported simultaneously and independently by three research groups in 1999: at the University of Toronto, see—Asefa, T.; MacLachlan, M. J.; Coombs, N.; Ozin, G. A. Periodic mesoporous organosilicas with organic groups inside the channel walls, *Nature,* 402, 867 (1999); the University of Minnesota, see Melde, B. J.; Holland, B. T.; Blanford, C. F.; Stein, A., Mesoporous sieves with unified hybrid Inorganic/organic frameworks, *Chem. Mater.* 11, 3302 (1999); and Toyota Research Laboratories, see—Inagaki, S.; Guan, S.; Fukushima, Y.; Ohsuna, T, Terasaki, O. Novel mesoporous materials with a uniform distribution of organic groups and inorganic oxide in their frameworks, *J. Am. Chem. Soc.,* 121, 9611 (1999). Toyota Corporation obtained a patent on this class of periodic mesoporous organosilica materials—Inagaki, S.; Guan, S.; Fukushima, Y. Organic/inorganic materials including complexes of porous materials. Ger. Offen. (2000), DE 19930944.

It involved the use of a new type of silica precursor in the surfactant templated co-assembly process, called silsesquioxanes exemplified by $(EtO)_3SiRSi(OEt)_3$, in which the organic function R instead of being present as a terminally bonded group to the alkoxysilane as referred to above is rather positioned as a "bridging group" between two alkoxysilyl groups. The resulting templated material is called a periodic mesoporous organosilica (PMO) in which the bridging organic group R is exclusively integrated into the silica framework to create organosilica channel walls. This represents a distinct situation to the earlier generation of organic-functionalized mesoporous materials mentioned above in which the organic groups are exclusively terminally bound to the surface of silica channel walls and protrude into the channel spaces. In the PMOs by contrast, the mesopores exist in an organosilica matrix built entirely from bridging $O_{1.5}SiRSiO_{1.5}$ moieties. Furthermore, by performing the same kind of template directed synthesis but instead using a controlled ratio of the silsequioxane and alkoxysilane precursors in the co-assembly process, it proved possible to access an entire family of PMO materials in which the loading of the bridging organic group in the organosilica channel walls can be varied between 100% and 0%. In this way it proved feasible to fine-tune the chemical and physical, mechanical and electrical, optical and electronic properties of the PMOs anywhere between the two end members with high fidelity. Other extensions involved the synthesis of novel classes of PMOs containing two or more distinct types of bridging organic groups or indeed PMOs with both bridging and terminal organic groups, see—Asefa, T.; Kruk, M.; MacLachlan, M. J.; Coombs, N.; Grondey, H.; Jaroniec, M.; Ozin, G. A., Novel bifunctional periodic mesoporous organosilicas, BPMOS: synthesis, characterization, properties and in-situ selective hydroboration-alcoholysis reactions of functional groups, *J. Am. Chem. Soc.,* 123, 8520 (2001).

Still other extensions involved the use of $[(EtO)_3Si]_nR$ silsesquioxane precursors in which n=3, 4 to yield PMOs in which the bridging organic group spanning the alkoxysilane groups can be triply or quadruply bonded and the organic content can be cross-linked to increase its thermal stability, see—Kuroki, M.; Asefa, T.; Whitnal, W.; Kruk, M.; Yoshina-Ishii, C.; Jaroniec, M.; Ozin, G. A. Synthesis and properties of 1,3,5-benzene periodic mesoporous organosilica (PMO): novel aromatic PMO with three point attachments and unique thermal transformations, *J. Am. Chem. Soc.* 124, 13886 (2002).

All of these breakthroughs essentially relegated the MCM and SBA classes of periodic mesoporous silica materials, which were devoid of useful functionality, to be the pure silica end-members of an enormous family of PMOs brimming with valuable functionality that could be orchestrated synthetically through the choice of the bridging organic group R to target a particular application.

The ability to directly include, in a predetermined fashion, bridging organic groups into the silica walls of a periodic mesoporous silica created an entirely new class of PMO nanocomposites, synthesized from the "bottom-up" and with "molecular scale" control, and which offered a myriad of envisioned opportunities based upon the ability to utilize organic synthetic chemistry to control the chemical and physical properties of the material.

The ability to directly include, in a predetermined fashion, bridging organic groups into the silica walls of a periodic mesoporous silica created an entirely new class of PMO nanocomposites, synthesized from the "bottom-up" and with "molecular scale" control, and which offered a myriad of envisioned opportunities based upon the ability to utilize organic synthetic chemistry to control the chemical and physical properties of the material.

The trend setting reports of the PMOs from the three inventor groups nevertheless inspired groups around the world to get involved in the materials and extend the research. Hundreds of papers have now appeared on PMOs (ISI lists more than 250 citations) and are beginning to demonstrate that diverse kinds of organic functionality can be incorporated into the materials, which can likely be exploited to advantage in a number of application areas including but not limited to catalysis and separations, chemical sensing, bioassays and controlled release of chemicals and drugs, microelectronic packaging and digital printing.

In related drug delivery applications, several papers are also now appearing in the literature where, for instance, the release of an inflammatory drug ibuprofen from mesoporous materials have been demonstrated; see—Vallet-Regi, M.; Rámila, A.; del Real, R. P.; Pérez-Pariente, J. A New Property of MCM-41: Drug Delivery System Chem. Mater. 3, 308 (2001).

There are, however, some serious deficiencies with the PMOs that are problematical with respect to a number of perceived areas of application s earmarked for the PMOs. These include the fact that a significant fraction of the bridging organic groups are buried within the internal regions of the organosilica channel walls and are therefore not able to be exploited in a number of applications that require them to be spatially accessible on the surface of the channel walls. These so-called inaccessible organics are essentially wasted in a chemical sense and serve only to make the cost of production of the PMO materials higher than it would have been had they not existed. Another problem concerns the geometric and steric constraints imposed on the bridging organic groups that are accessible on the channel wall surface of the PMO but not necessarily optimally aligned to exploit for example its adsorption and reactivity properties. Also, not all $(EtO)_3SiR-Si(OEt)_3$ silsesquioxane precursors are able to successfully assemble into PMO materials because of either competing and unwanted intramolecular cyclization reactions, unfavorable hydrolytic poly-condensation kinetics or collapse of the resulting PMO because the bridging organic group is insufficiently rigid to support the desired mesostructure.

It would be very advantageous to provide a method of producing an entirely new class of hybrid porous organic-metaloxide (HPO) materials that have all the desired attributes of the PMOs but are able to overcome deficiencies of the type mentioned but not limited by the ones mentioned above. Thus, an objective of the present invention is to provide a new class of hybrid porous organometaloxide (HPO) materials that have at least some of the desired attributes of the PMOs but are able to overcome the aforementioned deficiencies of the PMO materials.

SUMMARY OF THE INVENTION

In the broadest aspect of the invention there is provided a hybrid porous material having a porous framework material and pre-selected organic, organometallic, or biological molecules chemically attached to a surface of pores of the porous framework through two or more chemical linkages.

In one aspect of the invention there is provided a methodology for exclusively locating a desired bridging organic group just on the surface of the channel walls of, for example, a pre-existing mesoporous silica (MCM41, MCM48 or SBA type material), to create a novel kind of material that we denote a hybrid mesoporous organosilica, (HMO) material. The elegance of this invention is the simplicity of the underlying concept, namely a $(EtO)_3SiRSi(OEt)_3$ silsesquioxane precursor is chemically anchored through its alkoxysilyl groups to the silanol groups located on the channel surface of a pre-existing mesoporous silica in a very simple one step reaction. It is akin to "painting" the desired $(EtO)_3SiRSi(OEt)_3$ silsesquioxane organic functionality onto the channel walls of a periodic mesoporous silica, that is placing the organic just on the surface of the channel wall increases its reactivity and functionality.

Because the exemplary mesoporous framework materials (MCM41, MCM48 or SBA type material) referred to above are thermally and chemically stable, it has been established in this invention that these materials are a useful starting material to successfully anchor all types of $(EtO)_3SiRSi(OEt)_3$ silsesquioxane precursors that can be synthesized and reacted with the surface silanol groups of the silica channel walls. In this case, as none of the precursors fail to anchor and form an organosilica framework, this overcomes all of the deficiencies delineated above for the lack of formation of many PMOs because of self-assembly problems associated with intramolecular cyclization and flexibility of the $(EtO)_3SiRSi(OEt)_3$ silsesquioxane precursors or the instability of the structure of the resulting PMOs.

The present invention provides a method for producing a new class of nanocomposite materials we call hybrid mesoporous organometaloxides, hybrid macroporous organometaloxides, or hybrid mesoporous-macroporous metaloxides (HMOs). This new class of materials includes a porous metaloxide or a porous organometaloxide framework material to which an organic, organometallic or biological molecule has been attached to the surface of the pores through two or more chemical linkages. The unusual combination of inorganic and organic chemical structure with this scale of porosity and surfaces suggests a myriad of uses for HMOs, such as the controlled release and uptake of chemicals and drugs, chiral separations and catalysis, electronic printing, microelectronic packaging, chemical sensing and bioassays, and thermal and acoustic insulation.

The aforementioned framework materials preferably have pores in the size range of from about 5 to about 1,000 nm. These pores can be well-ordered and of uniform size, but this is not a requirement of this invention. Open frameworks with randomly oriented pores can work equally well. The organic, organometallic or biological molecules that are attached to the pore wall can be any molecules that contain two or more reactive groups that are capable of reacting with the surface of the metal oxide framework in such a way as to form chemical linkages and are capable of fitting into the pores.

As example only, silsesquioxanes of the general formula $(RO)_3Si$—$R'$—$Si(OR)_3$ can react through their alkoxysilyl groups with the pendant silanol groups of a porous silica framework to form two new Si—O—Si linkages between the silsesquioxane, and the framework, when the porous framework material is silica.

The present invention provides a method of synthesizing a hybrid mesoporous organometaloxide (HMO-1) material comprising the steps of: chemically binding a pre-selected silosesquioxane molecule to the pore walls of a pre-existing mesoporous metaloxide having a mesoporous framework through two or more chemical linkages.

In one aspect of the invention there is provided a method of synthesizing a hybrid porous material having a porous framework material and pre-selected organic, organometallic, or biological molecules chemically attached to a surface of pore walls of the porous framework through two or more chemical linkages, comprising the steps of:

a) preparing a porous framework material having pores and pore walls throughout with preselected porosity; and b) chemically binding pre-selected organic, organometallic, or biological molecules to the pore walls of the porous framework material through two or more chemical linkages.

In this aspect of the invention the step of preparing a porous framework material may include synthesizing the porous framework material by mixing a particulate constituent of the framework material with a suitable supramolecular template under conditions suitable for self-assembly of the particulate constituent to form the framework material, and removing the supramolecular template and the colloidal crystal. The framework material may be a metaloxide, or it may be an organometaloxide both of which may be mesoporous, macroporous, or combined mesoporous-macroporous having a porosity containing both size regimes of pores. The metaloxide may be silica.

BRIEF DESCRIPTION OF THE DRAWINGS

The method of producing new hybrid mesoporous and macroporous organic-metaloxides, in accordance with the present invention will now be described, by way of example only, reference being made to the accompanying drawings, in which.

DETAILED DESCRIPTION OF THE INVENTION

Figure 1:
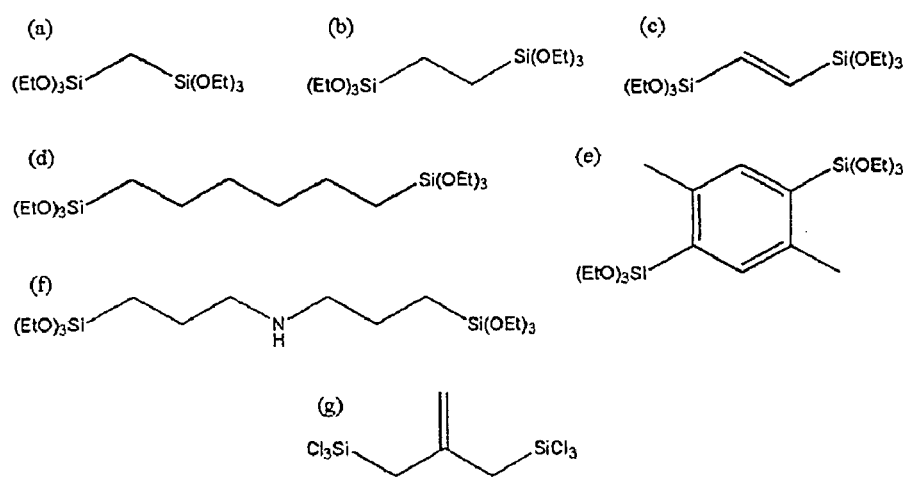
FIG. 1 illustrates the chemical structures of silsesquioxanes that were attached to the pore walls of PMS and PMO materials: (a) bis(triethoxysilyl)methane; (b) 1,2-bis(triethoxysilyl)ethane; (c) 1,2-bis(triethoxysilyl)ethylene; (d) 1,6-bis(triethoxysilyl)hexane; (e) 2,5-bis(triethoxysilyl)-p-xylene; (f) N,N-bis[3-(triethoxysilyl)propyl]amine; and (g) 1,1-bis(trichlorosilylmethyl)ethylene.

As used herein, the term "template" or "supramolecular template" means a self-aggregation of ionic or non-ionic molecules or polymers that have a structure directing function for another molecule or polymer.

As used herein, the term "periodic mesoporous" means having an ordered arrangement of pores in terms of translation symmetry with a diameter between about 2 and about 50 nm.

As used herein, the term "mesoporous" means having pores with a diameter between about 2 nm and about 50 nm.

As used herein, the term "macroporous" means having pores with a diameter between about 50 and about 1,000 nm.

As used herein, the term "mesoporous-macroporous" means having two different kinds of pores one of which is between about 2 nm and 50 nm and the other of which is between about 50 nm and about 1,000 nm in the structure.

As used herein, the term "surfactant or block copolymer mesostructure" means an ordered supramolecular assembly of surfactant or block copolymer molecule micelles, with translation symmetry between about 2 and about 50 nm.

As used herein, the term "colloidal crystal or opal templating" means the use of ordered void spaces created via a 3D assembly of colloidal microspheres of about 50 to about 1,000 nm in size as templates.

As used herein, the term "inverted colloidal crystal or opal" means an ordered array of void spaces created by an assembly of microspheres from about 50 to about 1,000 nm in size via colloidal crystal or opal templating followed by filling the void spaces with silica or organosilica precursors and then removing away the microspheres.

As used herein, the term "porous framework material" means the mesoporous or macroporous or mesoporous-macroporous material to which the organic, organometallic or biological molecules are attached via two or more chemical linkages.

As used herein, the term "guest molecule" means the organic, organometallic or biological molecule that is bound to the framework via two or more chemical linkages.

As used herein the term "HMO-1" means hybrid mesoporous organosilica Type-1 that includes a mesoporous metaloxide framework material that has had a silsesquioxane guest bound to its pore walls via two or more chemical linkages.

As used herein the term "HMO-2" means hybrid mesoporous organosilica Type-2 that includes a mesoporous organometaloxide framework material that has had a silsesquioxane guest bound to its pore walls via two or more chemical linkages.

As used herein the term "HMO-3" means hybrid macroporous organosilica Type-3 that includes a macroporous metaloxide framework material that has had a silsesquioxane guest bound to its pore walls via two or more chemical linkages.

As used herein the term "HMO-4" means hybrid macroporous organosilica Type-4 that includes a macroporous organometaloxide framework material that has had a silsesquioxane guest bound to its pore walls via two or more chemical linkages.

As used herein the term "HMO-5" means hybrid mesoporous-macroporous organosilica Type-5 that consists of a mesoporous-macroporous metaloxide framework material that has had a silsesquioxane guest bound to its pore walls via two or more chemical linkages.

As used herein the term "HMO-6" means hybrid macroporous organosilica. Type-6 that consists of a mesoporous-macroporous metaloxide or organometaloxide framework material that has had a silsesquioxane guest bound to its pore walls via two or more chemical linkages.

As used herein the term "organometaloxide" means a compound with the general formula $M_lO_mR_n$, where M is a metal, and R is an organic group and the material contains a metal-carbon bond, and l, m, and n are real positive numbers.

As used herein the term "metaloxide" means a simple metal oxide, for example including (but not limited to) boron oxide, magnesium oxide, aluminum oxide, gallium oxide, silicon oxide, germanium oxide, tin oxide, titanium oxide, zirconium oxide, niobium oxide, tantalum oxide, molybdenum oxide, tungsten oxide, etc.

As used herein the term "mixed metaloxide" means an oxide produced from a mixture of two or more metals.

As used herein the term "organic-metaloxide materials" refers to the new class of products produced in accordance with the present invention which is a hybrid including a porous framework material and pre-selected organic, organometallic, or biological molecules chemically attached to a surface of pores of the porous framework through two or more chemical linkages. The porous framework material may be a porous metal oxide with no organic content, or it may be a organometaloxide as defined above.

The present invention describes new composite materials, referred to as hybrid porous organic-metaloxides (HPO) materials in which organic, organometallic or biological guest molecules are chemically bound to a porous framework material through two or more chemical linkages.

For the purpose of demonstration only, periodic mesoporous silica (PMS) and periodic mesoporous organosilica (PMO) were chosen as the framework materials for the studies described herein. Additionally, silsesquioxanes of the general formula $[(RO)_3Si]_2R'$ were chosen as the guest molecules because these materials exemplify the claims that are being made herein. These specific examples give rise to a subclass of materials termed hybrid mesoporous organosilicas (HMO-1 and HMO-2—subclasses of hybrid porous organic-metaloxides, HPOs).

PMO and PMS materials with mesopore sizes of approximately 8 nm were synthesized using non-ionic block copolymer templates employing methods that have been previously described, specifically using Pluronic P123 as the supramolecular template, (see—Zhao, D.; Feng, J.; Huo, Q.; Melosh, N.; Frederickson, G. H.; Chmelka, B. F.; Stucky, G. D., Triblock copolymer syntheses of mesoporous silica with periodic 50 to 300 Angstrom pores *Science*, 279, 548 (1998) and Burleigh, M. C.; Markowitz, M. A.; Wong, E. M.; Lin, J. S.; Gaber, B. P., Synthesis of periodic mesoporous organosilicas with block copolymer templates *Chem. Mater.*, 13, 4411 (2001)). The template was then removed from these powders by washing exhaustively with 1:1 mixtures of acetone and diethyl ether.

A variety of silsesquioxanes were then attached to the pore walls of these templates. These silsesquioxanes include: bis(triethoxysilyl)methane; 1,2-bis(triethoxysilyl)ethane; 1,2-bis(triethoxysilyl)ethylene; 1,6-bis(triethoxysilyl)hexane; N,N-bis[3-triethoxysilyl)propyl]amine; and 2,5-bis(triethoxysilyl)-p-xylene. The chlorosilane 1,1-bis(triethoxysilylmethyl)ethylene was also used (see FIG. 1). It will be appreciated that this list of silsesquioxanes is for purposes of illustrating and are not in any way meant to limit the present invention, as those skilled in the art will appreciate that other silsesquioxanes may also be used.

In the all of the studies presented herein the supramolecular template was removed from the PMS or PMO prior to the addition of the silsesquioxane, however, it is also feasible to add the silsesquioxane directly to the as-synthesized template-containing PMS or PMO in a one step process whereby the silsesquioxane is able to simultaneously displace the imbibed template from the as-synthesized template-containing PMS or PMO and at the same time anchor to silanol groups on the pore wall of the PMS or PMO through two or more chemical linkages.

The present invention will now be exemplified using mesoporous organosilica as the porous framework material but it will be understood this is not meant to limit the invention to mesoporous organosilica porous frameworks.

Synthesis of HMOs

EXAMPLE 1

When Using a Silsesquioxane:

In a typical synthesis 1.0 g of template removed PMS was dried at 100° C. under vacuum for 24 hours and was then mixed with 75 mL of toluene. After stirring until the powder is well dispersed (approximately 30 min), 2.6 g (7.25 mmol)

of 1,2-bis(triethoxysilyl)ethane was added to the mixture. This mixture was then heated to reflux for 96 hours. The resulting powder was then isolated by vacuum filtration and washed several times with toluene, and then dried at 80° C. for at least 6 hours. This powder was then dispersed in a dilute NH$_4$OH solution for 24 hours in order to complete the hydrolysis of the ethoxysilyl groups. The powder was again isolated by vacuum filtration, washed with water and then dried at 100° C. Syntheses involving other silsesquioxanes or PMO templates were carried out analogously.

EXAMPLE 2

When using a Chlorosilane:

In a typical synthesis 1.0 g of template removed PMS was dried at 100° C. under vacuum for 24 hours and was then mixed with 75 mL of toluene. After stirring until the powder is well dispersed (approximately 30 min), 2.34 g (7.25 mmol) of 1,1-bis(trichlorosilylmethyl)ethylene was added to the mixture. This mixture was then heated to reflux for 96 hours. The resulting powder was then isolated by vacuum filtration and washed several times with toluene, and then dried at 80° C. for at least 6 hours. This powder was then dispersed in water for 24 hours in order to quench the residual chlorosilyl groups. The powder was again isolated by vacuum filtration, washed with water and then dried at 100° C.

The above processes were also repeated on the same powder samples in order to add multi-layers to the pore walls.

Analysis and Results

Figure 2:
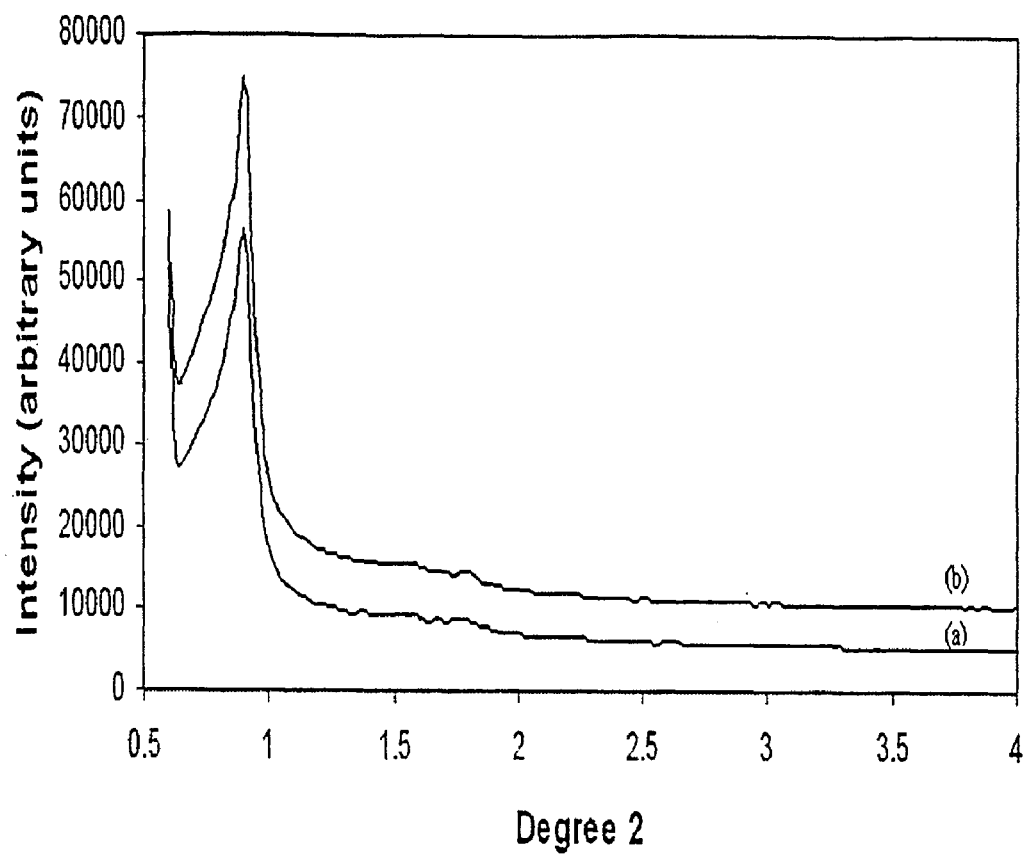
FIG. 2 shows the PXRD diffraction patterns of (a) a surfactant extracted PMS; and (b) surfactant extracted PMS that has been refluxed in pure toluene for 96 hours.
Figure 3:
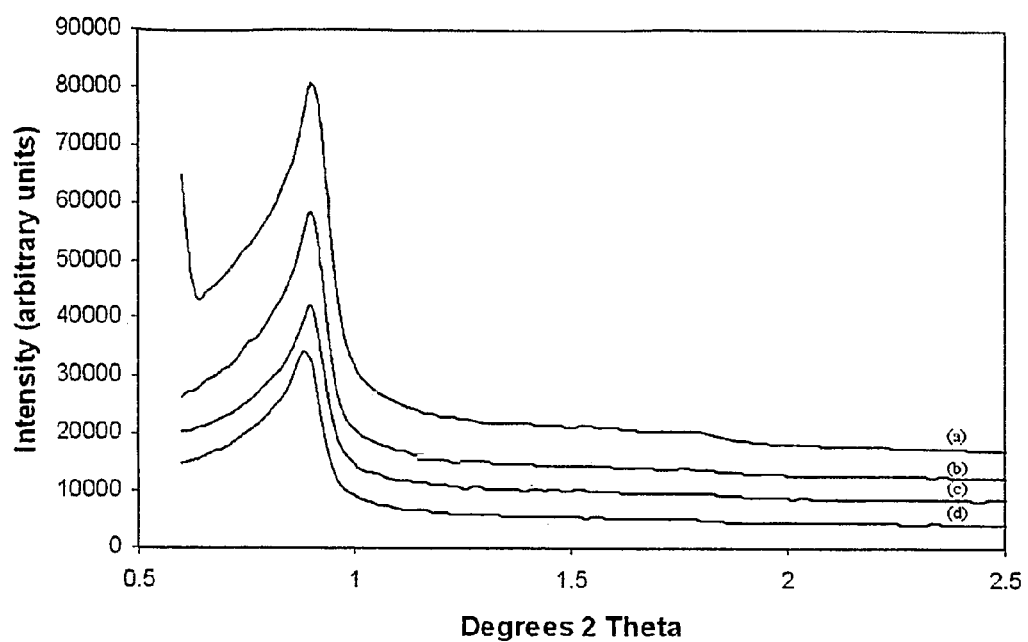
FIG. 3 shows the powder X-ray diffraction (PXRD) patterns of (a) mesoporous silica refluxed in toluene for 96 h; (b) mesoporous silica treated with 1,6-bis(triethoxysilyl)hexane; (c) mesoporous silica treated with bis(triethoxysilyl)methane; and (d) mesoporous silica treated with N,N-bis(triethoxysilylpropyl)amine.

Powder X-ray diffraction (PXRD) was used to confirm that the structure of the frameworks is retained in the treatments described above. FIG. 2 shows the X-ray diffraction patterns of a PMS framework before and after it has been refluxed in toluene for 96 hours. The peak positions and intensities remain constant indicating that the framework is not degraded. FIG. 3 shows that the addition of the silsesquioxanes 1,6-bis(triethoxysilyl)hexane, bis(triethoxysilyl)methane, and N,N-bis(triethoxysilylpropyl)amine during reflux gives similar results, showing no degradation of the silica framework.

Figure 4:
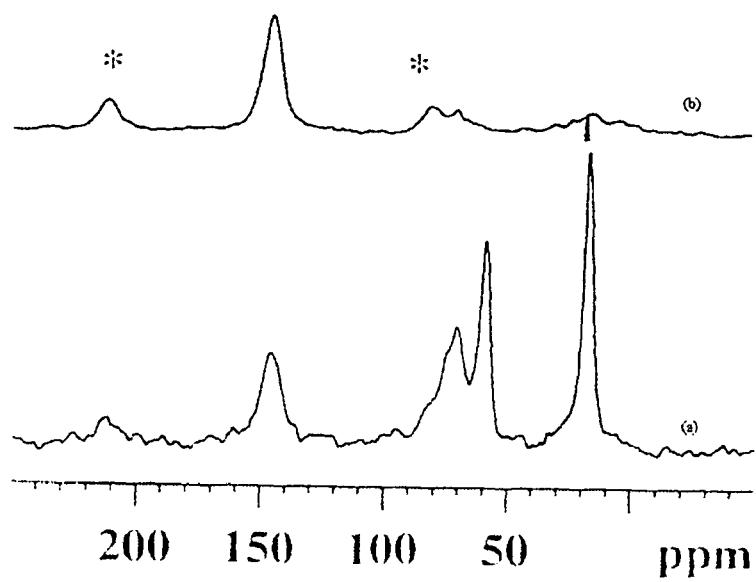
FIG. 4 shows the $^{13}C$ CPMAS NMR of: (a) a surfactant extracted PMS that has been treated with 1,2-bis(triethoxysilyl)ethane prior to the treatment in a basic solution; and (b) the same sample after treatment in dilute aqueous ammonia solution. The asterisks denote spinning side bands, and the peaks at 73 ppm are due to residual surfactant template.
Figure 5:
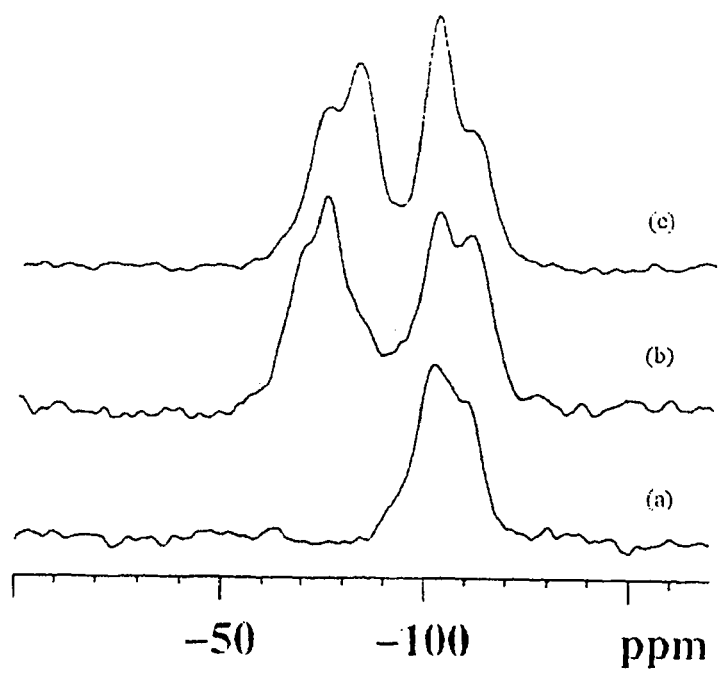
FIG. 5 shows the $^{29}Si$ MAS NMR of template extracted mesoporous silica (a) prior to any treatment; (b) after treatment with 1,2-bis(triethoxysilyl)ethane; and (c) following treatment with a dilute aqueous ammonia solution.

$^{13}$C CPMAS NMR confirms that the silsesquioxanes bind to the framework material. FIG. 4 shows the $^{13}$C CPMAS NMR of a PMS framework that has been treated with 1,2-bis(triethoxysilyl)ethane both before treatment in a basic solution and after this treatment. In FIG. 4*a* (before the powder has been treated in a basic solution) unhydrolyzed ethoxy groups cause the peaks at 57 ppm and 17 ppm. After treatment in a basic solution, FIG. 4*b*, these peaks are removed, confirming that hydrolysis is completed. The $^{29}$Si MAS NMR spectra of these samples, shown in FIG. 5, also confirm the addition of the silsesquioxane to the framework material. In FIG. 5*a*, before the addition of the silsesquioxane precursor, only Q sites are observed corresponding to the silica framework. In FIG. 5*b*, after treatment with 1,2-bis(triethoxysilyl) ethane, a strong signal can be seen in the T region of the spectrum, primarily corresponding to T1 (−70 ppm) and T2 (−77 ppm) signals, which results from the attachment of the silsesquioxane. After treatment in a basic solution, the T signals shift so that there are primarily T2 (−70 ppm) and T3 (−83 ppm) sites, indicating that the added silsesquioxanes condense further upon treatment.

Figure 6:
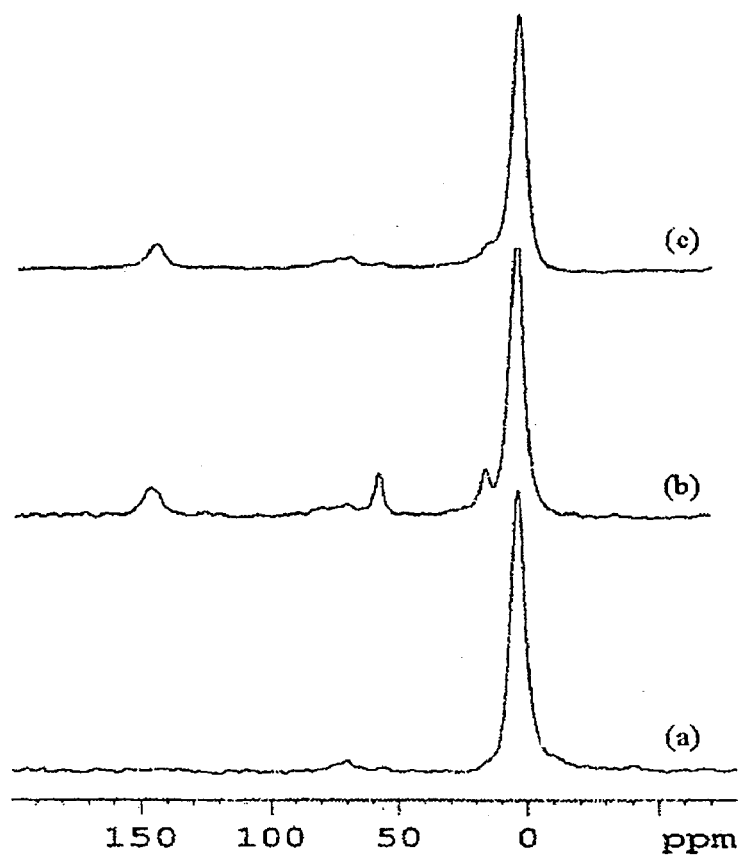
FIG. 6 shows $^{13}C$ CPMAS NMR of a PMO framework: (a) prior to any treatment; (b) after treatment with 1,2-bis(triethoxysilyl)ethene prior to the treatment in a basic solution; and (c) the same sample after treatment in a basic solution.

Similar results are observed when a PMO framework synthesized from 1,2-bis(triethoxysilyl)ethane is treated with 1,2-bis(triethoxysilyl)ethylene as seen in FIG. 6. In FIG. 6*a* the $^{13}$C CPMAS NMR of just the framework material is shown, and the only peak observed is that of the ethane group. After treatment with 1,2-bis(triethoxysilyl)ethylene a peak can be seen at 145 ppm corresponding to the ethylene group, as well as peaks at 57 ppm and 17 ppm corresponding to unhydrolyzed ethoxy groups (FIG. 6*b*). After treatment in a basic solution the peaks from the ethoxy groups are no longer present (FIG. 6*c*), confirming that hydrolysis has been completed.

Figure 7:
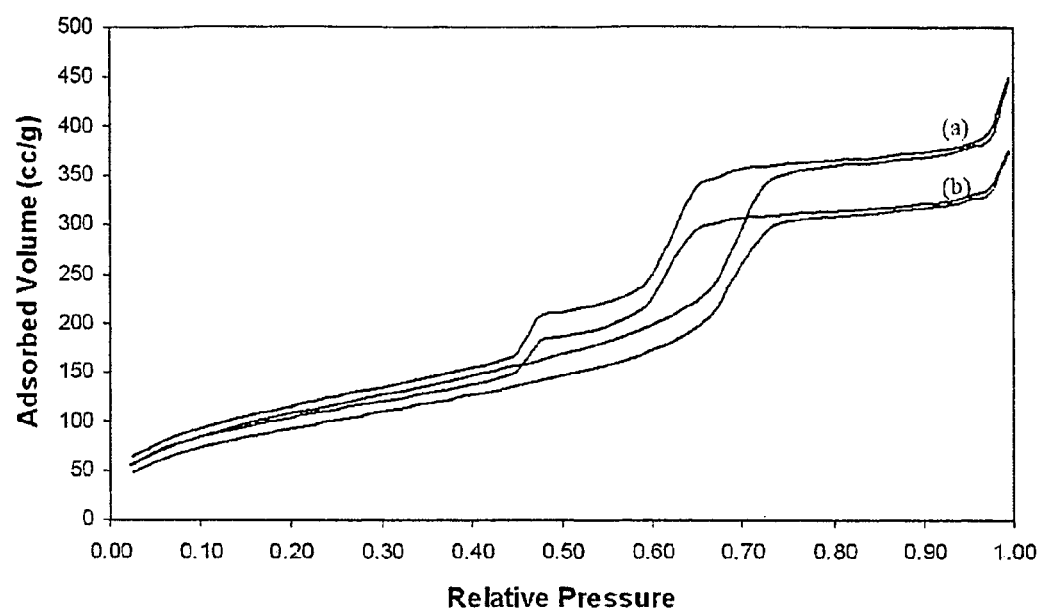
FIG. 7 shows the nitrogen adsorption isotherm of: (a) template extracted mesoporous silica that has been refluxed in pure toluene; and (b) mesoporous silica that has been treated with bis(triethoxysilyl)methane.
Figure 8:
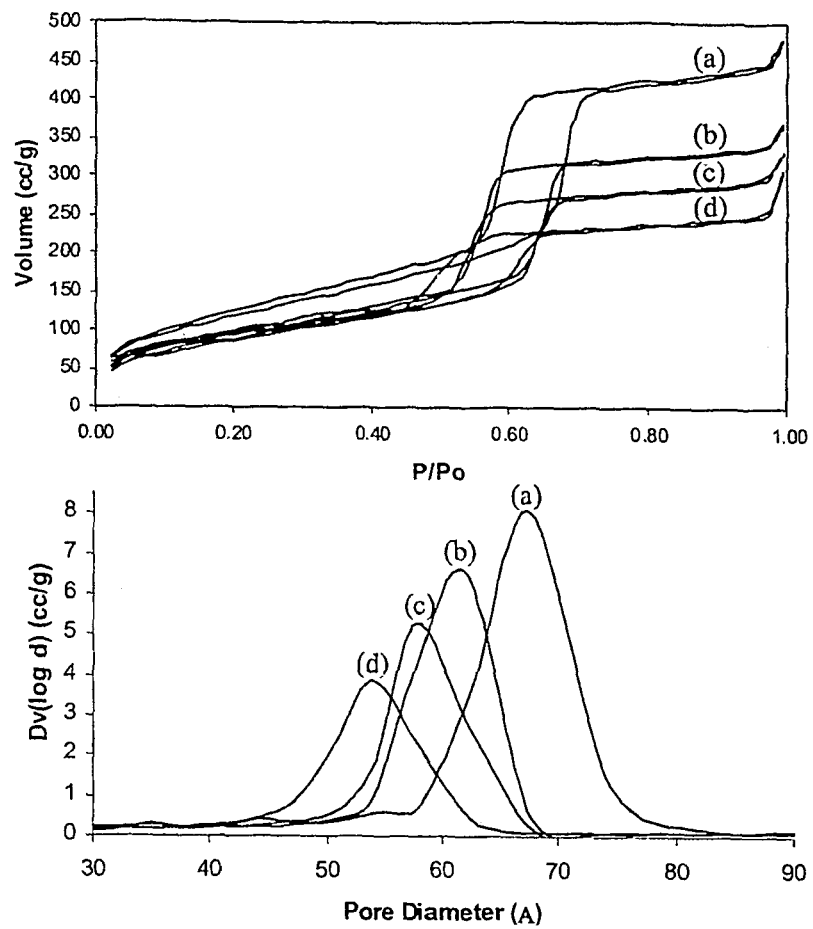
FIG. 8 shows the nitrogen sorption isotherms (top) and pore size distributions (bottom) of a PMS from which the polymer template has been removed (a), and the PMS after the addition of one (b), two (c) and three (d) layers of 1,2-bis(triethoxysilyl)ethane.

The porosity of the samples both before and after treatment with silsesquioxanes is confirmed by their nitrogen adsorption isotherms. FIG. 7 shows the isotherms of a PMS framework both before (FIG. 7*a*) and after (FIG. 7*b*) treatment with bis(triethoxysilyl)methane. A significant decrease in pore volume can be seen in the treated sample. Similar results are observed when using a chlorosilane. FIG. 8 shows the nitrogen adsorption isotherms of a PMS framework before any treatment (FIG. 8*a*), after one treatment with 1,1-bistrichlorosilylmethyl)ethylene (FIG. 8*b*) and after two treatments with 1,1-(bistrichlorosilylmethyl)ethylene (FIG. 8*c*). The pore volume can be seen to decrease with successive treatments. Additionally, the isotherms shift to lower pressures with successive treatments indicating decreasing pore sizes.

Figure 9:
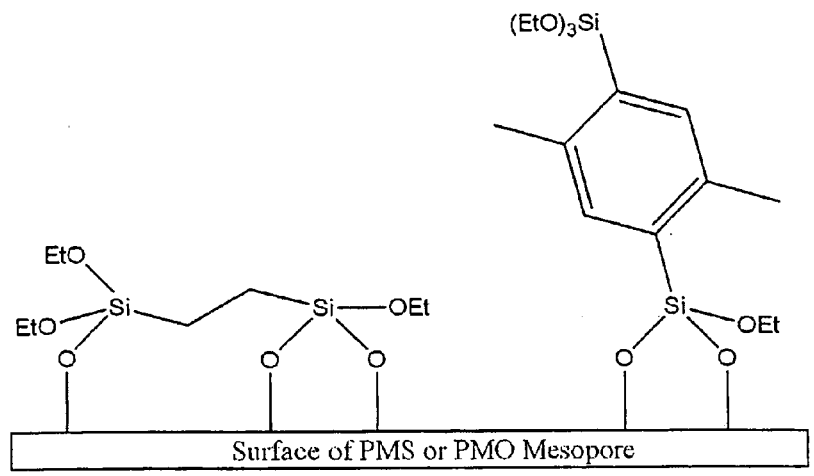
FIG. 9 shows a schematic representation of the potential binding modes of a silsesquioxane to a PMS or PMO substrate in which the silsesquioxane could bind through both Si atoms as in the case of 1,2-bis(triethoxysilyl)ethane, or through only a single silicon atom as in the case of 2,5-bis(triethoxysilyl)-p-xylene.
Figure 10:
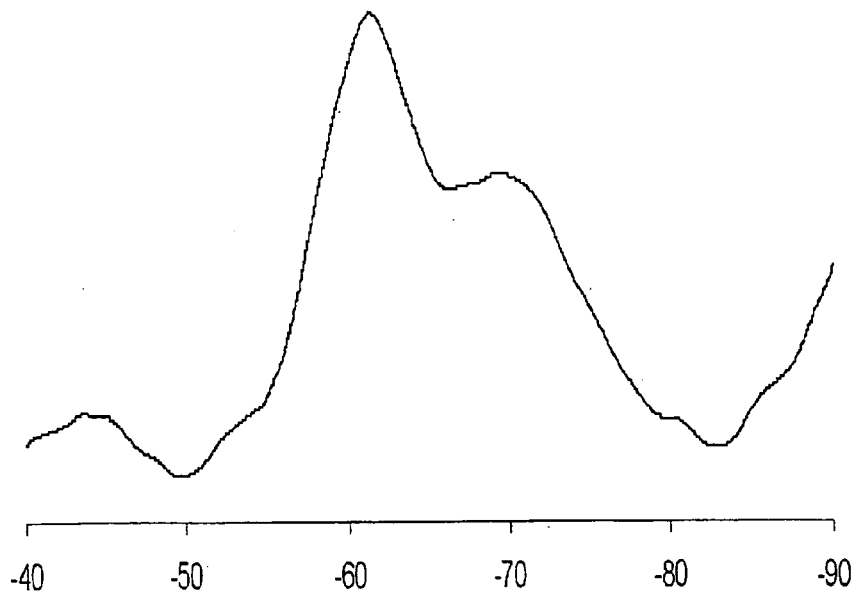
FIG. 10 shows the T region of the $^{29}Si$ MAS NMR spectrum of a PMS framework that has been treated with 2,5-bis(triethoxysilyl)-p-xylene.

$^{29}$Si MAS NMR can be used to verify that the silsesquioxane guest molecules do in fact bind to the PMS and PMO frameworks through two chemical linkages. If a PMS framework is treated with 2,5-bis(triethoxysilyl)-p-xylene then the rigidity of the aryl ring as well as the bulkiness of the methyl groups will prevent both silicon atoms from being able to bind to the framework, whereas when PMS is treated with 1,2-bis (triethoxysilyl)ethane both silicon atoms are able to bind to the framework as shown in FIG. 9. $^{29}$Si MAS NMR confirms these modes of binding. FIG. 10 shows the T region of the $^{29}$Si MAS NMR of a PMS framework that has been treated with 2,5-bis(triethoxysilyl)-p-xylene. A strong signal in the T0 region (−61 ppm) can be seen which corresponds to the silicon atom that is not bound to the framework. In comparison, the $^{29}$Si MAS NMR of a PMS framework that has been treated with 1,2-bis(triethoxysilyl)ethane (FIG. 5*b*) shows no signal in the T0 region indicating that both silicon atoms are bound to the framework. All other silsesquioxanes described herein were found to bind to the framework through both silicon atoms.

Figure 11:
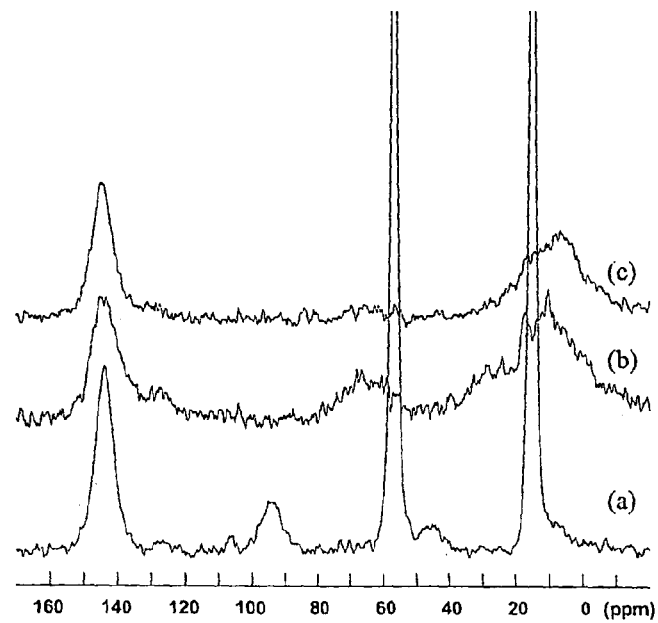
FIG. 11 shows the $^{13}C$ CPMAS NMR of (a) a PMS framework that has been treated with 1,2-bis(triethoxysilyl)ethene to form an HMO-1; (b) the HMO-1 after being treated with borane in a THF solution; and (c) the hydroborated HMO-1 after being treated with a dilute aqueous ammonia solution.
Figure 12:
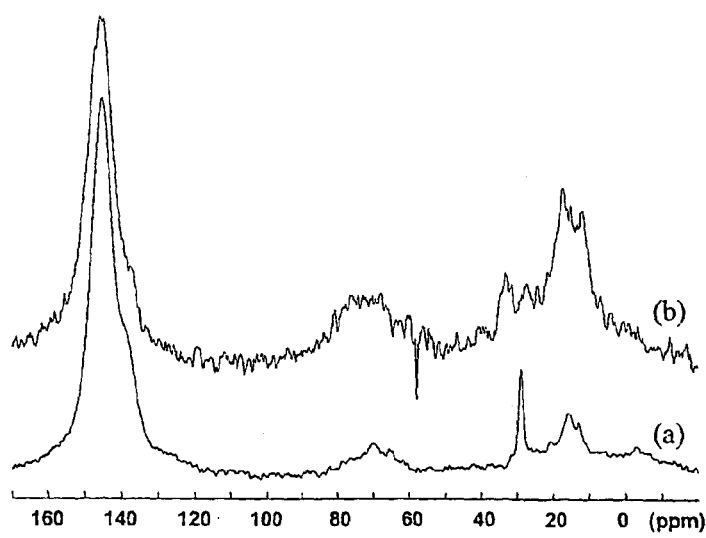
FIG. 12 shows the $^{13}C$ CPMAS NMR of (a) a PMO made from 1,2-bis(triethoxysilyl)ethene from which the surfactant template has been removed; and (b) the PMO after being treated with borane in a THF solution.
Figure 13:
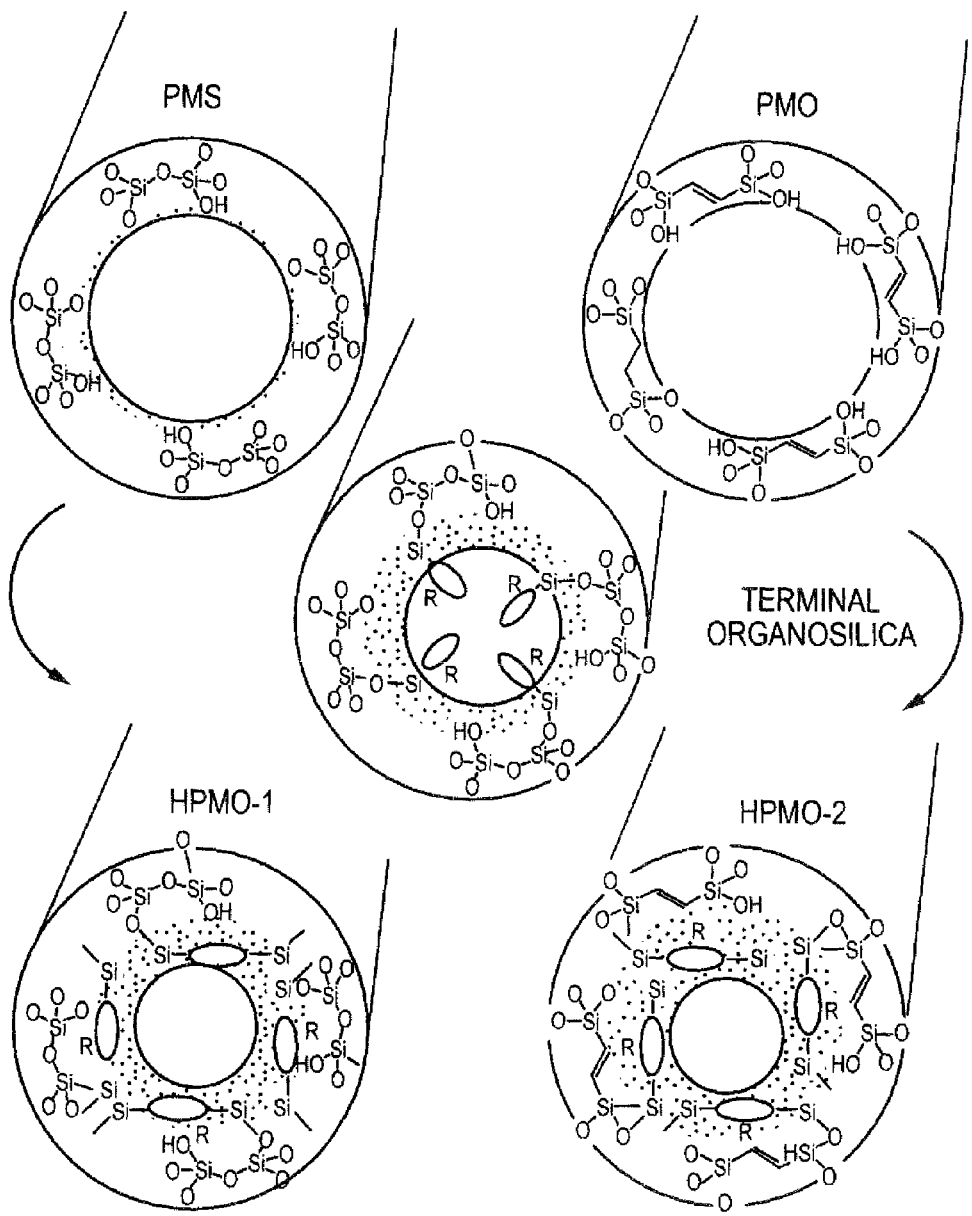
FIG. 13 shows Scheme 1 which shows (for illustrative purposes only) a representation of the structures of five key structures: top left—a PMS in which the pore walls are made entirely of silica; top right—a PMO in which the pore walls are made up of organic bridge-bonded silica; middle—a PMS to which an organosilane containing a terminally bonded organic group has been anchored to the pore walls through only one chemical linkage; bottom left—a HMO-1 in which a silsesquioxane containing a bridge bonded organic group has been anchored to a PMS framework through at least two chemical linkages; bottom right a HMO-2 in which a silsesquioxane containing a bridge bonded organic group has been bound to a PMO framework through at least two chemical linkages.

Since the silsesquioxanes in HMOs are located at the very surface of the pore walls of the framework material they are more chemically accessible than the silsesquioxanes that make up a PMO. This has been demonstrated by treating an HMO-1, where 1,2-bis(triethoxysilyl)ethene was used as the guest molecule, with borane in a tetrahydrofuran (THF) solution. The reaction progress was monitored by $^{13}$C CPMAS NMR as shown in FIG. 11. FIG. 11(*a*) shows the HMO-1 prior to reaction with borane. The peak at 143 ppm corresponds to the ethene carbons, while the peaks at 57 ppm and 17 ppm correspond to unhydrolyzed ethoxysilyl groups. FIG. 11(*c*) shows the HMO-1 after reaction with borane, followed by treatment with a dilute aqueous ammonia solution. The two broad peaks at 14 ppm and 7 ppm correspond to the hydroborated ethane.carbons For comparison a PMO was made using 1,2-bis(triethoxysilyl)ethene, the template was removed and it was reacted borane in THF. The reaction was monitored by $^{13}$C CPMAS NMR as shown in FIG. 12. FIG. 12(*a*) shows the PMO before reaction with borane. The peaks at 143 ppm correspond to the ethene carbons, while the peaks at 70 ppm and 15 ppm correspond to the carbons of residual template molecules. FIG. 12(*b*) shows the PMO after reaction with borane. In this case there are no new peaks at 14 ppm and 7 ppm indicating that the PMO did not react with borane to any appreciable extent under these reaction conditions.

PXRD patterns were measured with a Siemens D5000 diffractometer using Cu K$\alpha_1$-radiation ($\lambda$=154.18 pm). All solid state NMR experiments were performed with a Bruker DSX 400 NMR spectrometer. $^{29}$Si MAS NMR spectra were recorded at a spin rate of 5 kHz and a pulse delay of 1 min. $^{13}$C CPMAS NMR experiments were performed at a spin rate of 5 kHz, a contact time of 5 ms and a pulse delay of 3 s. Sorption experiments were performed by a Quantachrome Autosorb-1C machine with $N_2$ as sorption gas at 77 K starting at a relative pressure $p/p_0=10^{-5}$. Seven data points were selected for BET analysis from relative pressure of 0.1. SEM images were recorded with a Hitachi S-4500 microscope at 1 kV without Au coating on the samples.

With the invention disclosed herein the inventors have demonstrated that silsesquioxanes of the general formula [(RO)$_3$Si]$_2$R' can be chemically anchored to the walls of PMS frameworks (giving a sub-class of materials termed HMO-1) and PMO frameworks (giving a subclass of materials termed HMO-2) in such a way that the organic bridging group is bound to the wall through at least two chemical linkages. This provides a facile method of anchoring any number of different silsesquioxanes to the pore walls. These silsesquioxanes, depending on their structure, may be capable of imparting new physical and chemical properties to the highly porous framework materials, including, but not limited to, changing the dielectric constant of the material, increasing its hardness, improving its mechanical, thermal or acoustical behavior, imparting catalytic activity, separating and sensing molecules or biomolecules, releasing at a controlled rate imbibed chemicals or pharmaceuticals, or the ability to scrub toxins from the environment. By anchoring ligands to the channel walls, the resulting HPMO could be made into an ideal support for transition metal catalysts. These possibilities, amongst others, make HMOs useful for a wide variety of industrial applications.

The properties of the resulting hybrid mesoporous organosilica material depend on the nature of the framework, the anchoring molecule, the template and structure type (e.g. MCM41, MCM48 and SBA type). Basic areas of application amongst others include microelectronics (low dielectric constant or low-k materials), separation techniques (e.g. chiral drug separation), bio-delivery (e.g., pharmaceuticals, pesticides, herbicides, fragrances), chemical storage (e.g. gas storage like hydrogen or methane), catalysis, sensors, thermal and acoustic insulation.

It is to be emphasized that the HMOs described in this invention are quite distinct to all of the known PMOs disclosed in both the patent and open literature. These distinctions are illustrated in Scheme 1. Specifically, all known PMOs reported prior to the disclosure of the HMOs are synthesized in a process that involves the co-assembly of a silsesquioxane precursor and a surfactant or polymer template to create a PMO in which the organosilica material that comprises the pore wall is described as a homogeneous integrated matrix of the bridge bonded organic and silica constituents.

To be quite precise, the bridge bonded organic groups in the so-formed PMOs are located both on the surface of the pore walls and within the bulk regions of the pore walls. In contrast, the HMOs disclosed herein are instead synthesized by a procedure that involves the chemical anchoring of a silsesquioxane, through two or more chemical linkages, to the silanol groups on the pore surface of a pre-existing periodic mesoporous silica PMS. Hence the disclosed HMOs are clearly synthesized in a distinct way compared to all the -known PMOs, to be precise the HMOs are made by chemical grafting (anchoring, attachment, tethering) versus co-assembly for the PMOs, Furthermore the HMOs represent a distinct class of materials compared to the PMOs because in the HMOs the desired bridge bonded organic functionality is located exclusively on the surface of the pore walls and not in both the surface and bulk regions of the pore walls, which is a defining feature of the PMOs.

To further emphasize this difference, in the synthesis of the PMOs, the desired bridge bonded organic functionality has absolutely no option but to be located both on the surface and within the bulk regions of the pore walls. In the HMOs the synthesis is intentionally designed to place the desired bridge bonded organic functionality exclusively on the surface of the pore walls with none within the bulk regions of the pore walls as found in the PMOs.

Previous studies have shown that terminally functionalized organosilicon reagents can be bound to the pore walls of PMS and PMO materials. However in these circumstances the organic groups are left dangling in the void of the pore and are not an integral part of the wall of the material, as shown in Scheme 1. In HMOs on the other hand, the organic groups are bound to the surface of the pore walls through at least two chemical linkages, so that in the final material the organic group is a part of the wall.

All of the above is considered to represent a massive difference between the PMOs and HMOs from the point of view of their synthesis and structure, where to repeat, in the HMOs the bridge bonded organic groups are exclusively located on the pore wall surfaces whereas in the PMOs they are to be found both on the surface of the pore walls and in the bulk regions of the pore walls. This difference is especially important when it comes to designing and tailoring the chemical and physical properties, function and utility of the PMOs compared to the HMOs.

Hence the HMOs disclosed herein are (i) synthesized in a distinct way to the- PMOs and (ii) are structurally distinct to the PMOs. This is the basis of the distinctiveness of HMOs to PMOs.

The present invention also includes anchoring the (EtO)$_3$SiRSi(OEt)$_3$ silsesquioxane precursors on the surface of a preexisting PMO. In this way one can have one kind of bridging organic group within the channel walls and another type on the surface of the channel walls, thereby facilitating independent control of the chemical and physical properties of the HMOs. Another extension is to use [(EtO)$_3$Si]$_n$R silsesquioxane precursors with n=3, 4 in which the bridging organic group spanning the alkoxysilane groups can be triply or quadruply bonded as well as can have ring structures. The possibilities for modification of this simple process are limitless only being restricted by the imagination and organic-inorganic synthetic skills of those skilled in the art of making HMOs.

An advantage of the invention described herein is that it is now possible to use a low value periodic mesoporous silica of the type reported by Mobil Corporation (MCM41 and MCM48) or University of California at Santa Barbara (SBA) and transform it in a single and straightforward step into a high value HMO in which all of the desired bridging organic function is placed exactly where one needs it, namely exclusively on the surface of the channel walls. One can also carry out the same procedure on a mesoporous organosilica, macroporous, or mesoporous-macroporous silica or organosilica to make a HMO. These HMOs are useful for applications aimed at exploiting for example the chemical and physical, mechanical and electrical, acoustical and optical properties of the bridging organic function.

Therefore it is clear that hybrid mesoporous organosilicas, HMOs, are a new class of hybrid porous organometaloxide (HPO) material, which are considered to be quite distinct to either the mesoporous metaloxide (MCM41, MCM48, SBA type, etc.) or mesoporous organometaloxide (PMO) or macroporous metaloxide (silica inverted opal, titania inverted opal) or mesoporous-macroporous metaloxide (mesoporous silica inverted opal, mesoporous titania inverted opal) materials described above.

In this work, pure PMS and PMO frameworks were used as examples to show the potential of this invention, but these are not the only platforms contemplated by the inventors. For example, it is possible to produce PMO framework materials that contain several different organic bridging groups, or in which the organic groups are diluted with silica. The invention disclosed herein is applicable to all of these frameworks, regardless of their specific composition. Moreover it is not necessary that the frameworks be periodically ordered in the manner of the HMOs described herein for this invention to apply. A periodic mesoporous frameworks will work equally well.

The porous framework material useful in the present invention is not limited to PMS or PMO materials. The present invention also includes other porous framework materials, for example other types of porous open framework materials that are not based around silica. Porous titania (mesoporous or macroporous), as one example, has interesting electrical, optical and catalytic properties that could be exploited by chemically linking redox active molecules to the pore walls to be used for example in solar cells, electrochromic devices and photocatalysts. Other non-limiting examples include boron oxide, magnesium oxide, aluminum oxide, gallium oxide, germanium oxide, tin oxide, titanium oxide, zirconium oxide, niobium oxide, tantalum oxide, molybdenum oxide, tungsten oxide, etc. Any other simple oxide or mixed oxide may be used so long as the guest molecule can be bound thereto by at least two chemical linkages.

It will also be understood that other types of porous open framework materials, besides the above discussed mesoporous materials, including macroporous and mesoporous-macroporous metaloxides, may be used. For example, other materials that may be used include opals (colloidal crystals) and inverted opals (inverted colloidal crystals), and organometaloxides, such as any porous silica materials that contain terminally bound organic moieties, and high organic group content PMOs.

The present invention also provides a method of synthesizing a hybrid mesoporous organometaloxide (HMO-2) material comprising the steps of chemically binding a pre-selected silosesquioxane molecule to the pore walls of a pre-existing mesoporous organometaloxide having a mesoporous framework through two or more chemical linkages.

The present invention also provides a method of producing a hybrid macroporous organometaloxide, (HMO-3) comprising the steps of chemically binding a pre-selected molecule to the pore walls of a pre-existing macroporous metaloxide material having a macroporous framework through two or more chemical linkages.

The present invention also provides a method of producing a hybrid macroporous organometaloxide (HMO-4), comprising the steps of chemically binding a pre-selected molecule to the pore walls of a pre-existing macroporous organometaloxide material having both macroporous framework through two or more chemical linkages.

The present invention also provides a method of producing a hybrid mesoporous-macroporous organometaloxide, (HMO-5) comprising the steps of chemically binding a pre-selected molecule to the pore walls of a pre-existing mesoporous-macroporous metaloxide material having a macroporous framework through two or more chemical linkages.

The present invention also provides a method of producing a hybrid mesoporous-macroporous organometaloxide (HMO-6), comprising the steps of chemically binding a pre-selected molecule to the pore walls of a pre-existing mesoporous-macroporous organometaloxide material having both mesoporous-macroporous framework through two or more chemical linkages.

The present invention provides a method of synthesizing a hybrid mesoporous or macroporous or mesoporous-macroporous organosilicas (HMOs) comprising the steps of chemically binding a pre-selected molecule to the pore walls of a pre-existing mesoporous or macroporous or mesoporous-macroporous material having a porous framework through two or more chemical linkages and then chemically converting the anchored molecules into other functional groups via chemical reaction.

Also anchoring molecules are not limited to silsesquioxanes with a bridging organic group and two or more chemical linking groups, they can also be multi-binding phosphonates, sulfonates, carboxylates with a bridging organic group to name a few. This allows useful functional molecules to be bound directly to materials that may have desirable electrical, or photochemical properties that are lacking in the silica based framework materials thereby increasing their utility. The guest molecules can include not only silsesquioxanes (either a single type or a combination of different types), but also any type of guest that will bind to the framework material via two or more linkages, more generally any type of organic, organometallic, or biological molecule may be used. Other molecules besides the silsesquioxanes that may be used are exemplified by, but not limited to all manner of bis-phosphonates, bis-carboxylates and bis-sulphonates and combinations thereof.

The pore walls of the frameworks to be coated to varying extents by the organic, organometallic or biological molecules. By choosing the synthesis conditions carefully it is possible to completely cover the pore walls with a monolayer or to have only very sparse sub-monolayer coverage. By judicious selection of the pre-selected molecules and anchoring chemistry it is also possible to produce uniform multilayers of either the same guest molecule or differing guest molecules and by means of which one can also control the wall thickness and enhance the mechanical stability of the materials. The present invention provides a hybrid porous organosilca (HPO) material comprising a mesoporous or macroporous or mesoporous-macroporous framework and pre-selected organic, organometallic, or biological molecules chemically attached to a surface of the pores through two or more chemical linkages.

The hybrid materials disclosed herein may be prepared with a range of morphologies exemplified but not limited to, powder, free standing or supported film, patterned film, monolith, fiber, hollow cylinder, spirals or sphere forms.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A hybrid porous material having a porous framework material and pre-selected organic, organometallic, or biological molecules chemically attached to a surface of walls of pores of the porous framework through two or more chemical linkages.

2. The material according to claim 1 in which the porous framework material is a porous metaloxide.

3. The material according to claim 1 in which the porous framework material is a mesoporous metaloxide.

4. The material according to claim 1 in which the porous framework material is a macroporous metaloxide.

5. The material according to claim 1 in which the porous framework material is a mesoporous-macroporous metaloxide.

6. The material according to claim 2 in which the metaloxide is silica.

7. The material according to claim 2 in which the metaloxide is selected from the group consisting of oxides of boron, magnesium, aluminum, gallium, germanium, tin, titanium, zirconium, niobium, tantalum, molybdenum, tungsten and mixed metals.

8. The material according to claim 1 in which the porous framework material is a porous organometaloxide.

9. The material according to claim 8 in which the porous organometaloxide is a mesoporous organometaloxide.

10. The material according to claim 8 in which the porous organometaloxide is a macroporous organometaloxide.

11. The material according to claim 8 in which the porous organometaloxide is a mesoporous-macroporous organometaloxide.

12. The material according to claim 8 in which the organometaloxide is organosilica.

13. The material according to claim 3 in which the mesoporous metaloxide is mesoporous silica selected from the group consisting of MCM41, MCM48 and SBA type mesoporous silica.

14. The material according to claim 1 in which pore walls of the porous framework material are amorphous.

15. The material according to claim 1 in which pore walls of the porous framework material are crystalline.

16. The material according to claim 1 in which pore walls of the porous framework material are partially crystalline.

17. The material according to claim 1 in which pore walls of the porous framework material are periodically ordered.

18. The material according to claim 1 in which pores of the porous framework material are disordered.

19. The material according to claim 1 in which the porous framework material is an inverted opal.

20. The material according to claim 1 in which the pre-selected molecules are silsesquioxanes.

21. The material according to claim 20 wherein the silsesquioxanes are selected from the group consisting of bis(triethoxysilyl)methane; 1,2-bis(triethoxysilyl)ethane, 1,2-bis(triethoxysilyl)ethylene; 1,4-bis(triethoxysilyl)benzene; 1,3-bis(triethoxysilyl)benzene; 1,3,5-tris(triethoxysilyl)benzene, and combinations thereof.

22. The material according to claim 1 in which pore walls of the porous framework material are partially covered by the pre-selected molecules.

23. The material according to claim 1 in which pore walls of the porous framework material are substantially completely covered by the pre-selected molecules.

24. The material according to claim 1 in which the pre-selected molecules bound to pore walls of the porous framework material are of a single type.

25. The material according to claim 1 in which the pre-selected molecules bound to pore walls of the porous framework material are of two or more different types.

26. The material according to claim 1 in which the pre-selected molecules bound to the pore walls to form at least one layer or multiple layers.

27. The material according to claim 1 in which the linkages between the framework and the pre-selected molecules are Si—O—Si linkages or Si—R—Si linkages.

28. The material according to claim 1 formed as a powder.

29. The material according to claim 1 formed as a film.

30. The material according to claim 1 formed as a monolith.

31. A method of synthesizing a hybrid porous material having a porous framework material and pre-selected organic, organometallic, or biological molecules chemically attached to a surface of pore walls of the porous framework through two or more chemical linkages, comprising the steps of:
a) preparing a porous framework material having pores and pore walls throughout with preselected porosity; and
b) chemically binding pre-selected organic, organometallic, or biological molecules to a surface of the pore walls of the porous framework material through two or more chemical linkages.

32. The method according to claim 31 wherein the step of preparing a porous framework material includes synthesizing the porous framework material by mixing a particulate constituent of the framework material with a suitable supramolecular template under conditions suitable for self-assembly of the particulate constituent to form the framework material, and removing the supramolecular template.

33. The method according to claim 31 in which the framework material is a metaloxide.

34. The method according to claim 33 in which the suitable supramolecular template is selected to give a porous framework material which is a mesoporous metaloxide.

35. The method according to claim 33 in which the suitable supramolecular template is selected to give a porous framework material which is a macroporous metaloxide.

36. The method according to claim 33 in which the suitable supramolecular template is selected to give a porous framework material which is a mesoporous-macroporous metaloxide.

37. The method according to claim 33 in which the metaloxide is silica.

38. The method according to claim 33 in which the metaloxide is selected from the group consisting of oxides of boron, magnesium, aluminum, gallium, indium, germanium, tin, titanium, zirconium, niobium, tantalum, molybdenum, tungsten and mixed metals.

39. The method according to claim 31 in which the framework material is an organometaloxide.

40. The method according to claim 39 in which the suitable supramolecular template is selected so that the porous organometaloxide is a mesoporous organometaloxide.

41. The method according to claim 39 in which the suitable supramolecular template is selected so that the porous organometaloxide is a macroporous organometaloxide.

42. The method according to claim 39 in which the suitable supramolecular template is selected so that the porous organometaloxide is a mesoporous-macroporous organometaloxide.

43. The method according to claim 39, in which the organometaloxide is organosilica.

44. The method according to claim 34 in which the mesoporous metaloxide is mesoporous silica selected from the group consisting of MCM41, MCM48 and SBA type mesoporous silica.

45. The method according to claim 31 in which pore walls of the porous framework material are amorphous.

46. The method according to claim 31 in which pore walls of the porous framework material are crystalline.

47. The method according to claim 31 in which pore walls of the porous framework material are partially crystalline.

48. The method according to claim 31 in which pore walls of the porous framework material are periodically ordered.

49. The method according to claim 31 in which pores of the porous framework material are disordered.

50. The method according to claim 31 in which the porous framework material is an inverted opal.

51. The method according to claim 31 in which the pre-selected molecules are silsesquioxanes.

52. The method according to claim 51 wherein the silsesquioxanes are selected from the group consisting of bis(triethoxysilyl)methane; 1,2-bis(triethoxysilyl)ethane, 1,2-bis(triethoxysilyl)ethylene; 1,4-bis(triethoxysilyl)benzene; 1,3-bis(triethoxysilyl)benzene; 1,3,5-tris(triethoxysilyl)benzene, and combinations thereof.

53. The method according to claim 31 in which pore walls of the porous framework material are partially covered by the pre-selected molecules.

54. The method according to claim 31 in which pore walls of the porous framework material are substantially completely covered by the pre-selected molecules.

55. The method according to claim 31 in which the pre-selected molecules bound to pore walls of the porous framework material are of a single type.

56. The method according to claim 31 in which the pre-selected molecules bound to pore walls of the porous framework material are of two or more different types.

57. The method according to claim 31 in which the pre-selected molecules bound to the pore walls to form at least one layer or multiple layers.

58. The method according to claim 31 in which the linkages between the porous framework material and the pre-selected molecules are Si—O—Si linkages or Si—R—Si linkages.

59. The method according to claim 31 including a step of forming the hybrid porous material as a powder.

60. The method according to claim 31 including a step of forming the hybrid porous material as a film.

61. The method according to claim 31 including a step of forming the hybrid porous material as a monolith.

* * * * *